US010140366B2

(12) United States Patent
Platt et al.

(10) Patent No.: US 10,140,366 B2
(45) Date of Patent: *Nov. 27, 2018

(54) FINDING DATA IN CONNECTED CORPUSES USING EXAMPLES

(71) Applicant: Microsoft Technology Licensing, LLC, Redmond, WA (US)

(72) Inventors: John C. Platt, Bellevue, WA (US); Surajit Chaudhuri, Redmond, WA (US); Lev Novik, Bellevue, WA (US); Henricus Johannes Maria Meijer, Mercer Island, WA (US); Efim Hudis, Bellevue, WA (US); Kunal Mukerjee, Redmond, WA (US); Christopher Alan Hays, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,303

(22) Filed: Mar. 16, 2015

(65) Prior Publication Data
US 2015/0193533 A1 Jul. 9, 2015

Related U.S. Application Data

(63) Continuation of application No. 13/443,681, filed on Apr. 10, 2012, now Pat. No. 8,983,954.

(51) Int. Cl.
*G06F 17/30* (2006.01)

(52) U.S. Cl.
CPC .... *G06F 17/30758* (2013.01); *G06F 17/3053* (2013.01); *G06F 17/30303* (2013.01);
(Continued)

(58) Field of Classification Search
CPC ......... G06F 17/30539; G06F 17/30395; G06F 17/2276; G06F 17/2795
(Continued)

(56) References Cited

U.S. PATENT DOCUMENTS 5,448,727 A 9/1995 Annevelink
6,691,140 B1 2/2004 Bogrett
(Continued)

FOREIGN PATENT DOCUMENTS

CN 1508728 A 6/2004
CN 1758251 A 4/2006
(Continued)

OTHER PUBLICATIONS

Office Action issued in Chinese Patent Application No. 201380019331.3, dated Dec. 2, 2016.
(Continued)

*Primary Examiner* — Jean M Corrielus
(74) *Attorney, Agent, or Firm* — Workman Nydegger

(57) ABSTRACT

In one embodiment, datasets are stored in a catalog. The datasets are enriched by establishing relationships among the domains in different datasets. A user searches for relevant datasets by providing examples of the domains of interest. The system identifies datasets corresponding to the user-provided examples. The system them identifies connected subsets of the datasets that are directly linked or indirectly linked through other domains. The user provides known relationship examples to filter the connected subsets and to identify the connected subsets that are most relevant to the user's query. The selected connected subsets may be further analyzed by business intelligence/analytics to create pivot tables or to process the data.

20 Claims, 6 Drawing Sheets

(52) U.S. Cl.
CPC .. *G06F 17/30395* (2013.01); *G06F 17/30539* (2013.01); *G06F 17/30595* (2013.01); *G06F 17/30722* (2013.01); *G06F 17/30867* (2013.01)

(58) Field of Classification Search
USPC ................................. 707/737, 736, 740, 724
See application file for complete search history.

(56) References Cited

U.S. PATENT DOCUMENTS

| | | |
|---|---|---|
| 6,842,758 B1 | 1/2005 | Bogrett |
| 7,065,451 B2 | 6/2006 | Garner et al. |
| 7,333,995 B2 | 2/2008 | Desbiens |
| 7,613,700 B1 | 11/2009 | Lobo et al. |
| 7,685,146 B2 | 3/2010 | Wu et al. |
| 7,698,285 B2 * | 4/2010 | Grosset et al. ............ 707/999.1 |
| 7,873,667 B2 | 1/2011 | Lobo et al. |
| 7,899,832 B2 | 3/2011 | Abhyankar et al. |
| 7,912,841 B2 | 3/2011 | Brands et al. |
| 7,917,511 B2 | 3/2011 | Cannon et al. |
| 8,286,100 B2 * | 10/2012 | Helfman et al. ............. 715/855 |
| 8,447,747 B1 * | 5/2013 | Yi .................... G06F 17/30867 707/705 |
| 8,640,056 B2 * | 1/2014 | Helfman et al. ............. 715/854 |
| 8,943,079 B2 * | 1/2015 | Huang et al. ................. 707/757 |
| 8,983,954 B2 | 3/2015 | Platt et al. |
| 2003/0083892 A1 * | 5/2003 | Ramachandran ...... G06Q 30/06 705/26.1 |
| 2003/0126144 A1 * | 7/2003 | O'Halloran ....... G06F 17/30398 |
| 2004/0088315 A1 * | 5/2004 | Elder ................ G06F 17/30722 |
| 2004/0088322 A1 * | 5/2004 | Elder ................ G06F 17/30722 |
| 2005/0154727 A1 * | 7/2005 | O'Halloran ....... G06F 17/30398 |
| 2007/0156677 A1 * | 7/2007 | Szabo ............... G06F 17/30522 |
| 2007/0255745 A1 | 11/2007 | Gargi |
| 2008/0133568 A1 | 6/2008 | Grosset et al. |
| 2008/0270456 A1 * | 10/2008 | O'Halloran ....... G06F 17/30398 |
| 2009/0013270 A1 * | 1/2009 | Helfman et al. ............. 715/764 |
| 2009/0024590 A1 * | 1/2009 | Sturge ............... G06F 17/30893 |
| 2009/0254884 A1 * | 10/2009 | Rama ........................ G06F 8/75 717/124 |
| 2010/0106724 A1 * | 4/2010 | Anderson ......... G06F 17/30979 707/737 |
| 2010/0274810 A1 * | 10/2010 | Walker .............. G06F 17/30867 707/780 |
| 2011/0010399 A1 * | 1/2011 | Leary ................ G06F 17/30539 707/803 |
| 2012/0124478 A1 * | 5/2012 | King ................. G06F 17/30943 715/738 |
| 2013/0198188 A1 * | 8/2013 | Huang et al. .................. 707/737 |
| 2015/0161221 A1 * | 6/2015 | Carpenter ......... G06F 17/30563 707/764 |

FOREIGN PATENT DOCUMENTS

| | | |
|---|---|---|
| CN | 101479697 A | 7/2009 |
| CN | 101694952 A | 4/2010 |
| CN | 102222081 A | 10/2011 |
| CN | 102243647 A | 11/2011 |
| WO | WO2011112960 A2 | 9/2011 |

OTHER PUBLICATIONS

Cafarella et al. "Data Integration for the Relational Web", Proceedings of the VLDB Endowment, VLDB '09, Aug. 24-28, 2009, 12 pages.

"Second Office Action Issued in Chinese Patent Application No. 201380019331.3", dated May 5, 2017, 11 Pages.

* cited by examiner

FINDING DATA IN CONNECTED CORPUSES USING EXAMPLES

RELATED APPLICATIONS

This application is a continuation of pending U.S. application Ser. No. 13/443,681, filed Apr. 10, 2012, the disclosure of which is hereby incorporated by reference herein in its entirety.

BACKGROUND

Three problems must be solved when one is faced with a question that needs to be answered using data. First, one or more datasets must be identified as containing the data required to answer the question. Second, the relationships among the datasets and the data stored therein must be identified. Third, one or more queries must be formulated to answer the question. As the number of available dataset groups grows, the first two problems are becoming increasingly more complex compared to the third problem, yet most of the efforts in the storage systems area are focused on the formulation of queries.

Common approaches to the first two problems fall into two categories:

One approach requires the data to be well-organized into a well-understood semantic model prior to performing searches. Although powerful, such mechanisms have limited use due to the difficulty of organizing all of the data in advance of the searching.

In another approach, full text searches are used in the data sets. The datasets are treated as if they are typical documents and full-text search techniques are applied to the content. While this technique can easily handle any type of data, the inability to understand and utilize the structure of the data and the relationships within it makes it unlikely that complex questions can be answered by full text searches alone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system develops an understanding of the structure of datasets and their relationships either from human input or from machine learning. A user provides examples of data and relationships that explain his or her query. The mechanism uses its knowledge of the dataset structures and searches the datasets for information that is similar to the pattern of the examples. This allows users who are domain experts, but database novices, to find and understand the necessary datasets to answer the query.

For example, domains or data types may be used to establish column relationships within datasets. Data value examples may be used to identify domains of interest and the associated columns within the datasets. The minimal connected dataset subset that covers the domains referred by the user is identified as a potential or likely collection of datasets needed to answer the query. The relationship examples are used to filter the connected dataset subsets to quickly find the datasets that are actually of interest to the user.

A user finds domains of interest by specifying collections of values. Relationships between the domains are identified by analyzing domain overlaps and connections within the domains, such as columns that appear in multiple domains. Relationships may be ranked or valued by their strength and/or by the relationship's coverage of the individual values specified by the user. The user may provide example relationships among the values, such as known corresponding values, to narrow the dataset search field.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
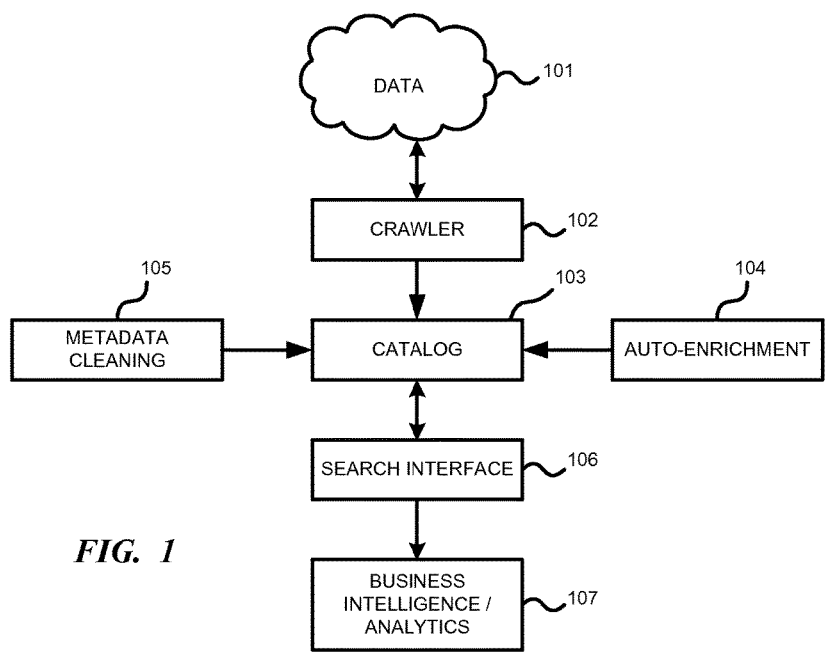
FIG. 1 is a block diagram of a system for searching datasets using examples according to one embodiment.

In one embodiment, data may be stored in a relational model; however, it will be understood that the datasets are not limited to relational databases. In this model, value types are computed for all columns. Any columns with value types that are highly similar are considered related. For example, if one column is a subset of another column, then these columns are considered to be related. The strength of the columns' relationship is derived from the degree of similarity in the types. For example, a relationship graph of columns may be constructed where two columns are related if they sharing a type or belong to the same dataset.

The types themselves may form a hierarchy by containment, such that types can have sub-types. Columns that share the same type and have a strong degree of similarity may be clustered together to form column clusters.

Starting with this model, a user may search the data using examples. People naturally express their world in terms of entities and relationships even when they do not use those words specifically. This type of expression may be used to search the datasets. First, the users search for entities by giving a collection of words of the same type. For example, a user looking for country data might enter "United States" as an example, but this entry alone is very ambiguous. If the example "Canada" is added, then the domain has been narrowed, but these two words together may correlate to a number of things. If a third example, such as "Norway" is added, then the search has been dramatically narrowed to countries. It will be noted that this technique just by analyzes the datasets and works even if the system is not aware of the concept of "countries."

If the examples are not sufficient, the user can disambiguate the search by presenting alternative interpretations, such as lists of additional terms. For instance, "Brazil" will result in a list of countries, as well as a list of types of nuts. The user can easily accept or reject the entity types desired.

The next step is to identify the relationships between the entities the user has found. As noted above, the system computed a relationship graph of columns in the dataset models. Applying the list of domains found by the user's example terms to the relationship graph, the system constructs minimal connected subsets that connect all of the specified domains. Each such connected subset represents a different path to relate all of the data found by the user. These connections may be weighted, for example, based on the combined strength of the underlying relationships. Single- or multiple-value weighting functions may be used. Some or all of the connected subsets are presented to the user. In one embodiment, example values are used to present a relationship or, more generally, a connected subset to the user. The user then selects the connected subset that best fits the query.

Explaining a relationship among datasets to the user using examples is much easier than attempting to get the user to explain a desired relationship to the system, which is the current method of searching. In the system described herein, no Apriori schema modeling is assumed or required among the datasets.

Diverse values may be connected using this system. In the example above, countries were identified. In another query, the user may want to associate countries or cities with currency. For example, to connect "City name" to "Currency," the user will pick an example value for the city and follow the logic described above. To connect "Vancouver" to "Loonie" (the Canadian 1 dollar coin), the user may use a City dataset and a Currency dataset, which will join on Country columns that have a similar type. The user may present examples of cities and currencies. The system will then present the data connected through different values. The user will select a connected data set that connected through the country values. The user's question may be answered by linking the data sets using the country value of "Canada."

If the user does not see a desired set of connections in the proposed connected subsets, then the user has two options to influence the system. First, the user may add more entities. For instance, if the "Loonie" example above was meant to be a bird instead of currency, then giving additional bird names will force the system to re-interpret the value to achieve a low-weighted connection set that includes birds.

The pinnacle of user control is the presentation of relationship examples. For example, if a user is looking for the year in which Canada gained independence, the user may explain the notion of "Country" and the notion of "Year" to the system. The user is likely to find that there are too many Country-Year relationships among the datasets. However, if the user supplies a known example Country-Year pair, such as "USA-1776," the system will understand the correct interpretation of the Country-Year relationship based on the need to include this example in the desired set of connections. Accordingly, the system will prioritize connected subsets that meet the "USA-1776" example and will present those to the user first.

FIG. 1 is a block diagram of a system for searching datasets using examples according to one embodiment. The user wants to search some universe of data 101, which may include datasets having many different formats. For example, data 101 may include databases, spreadsheets or other datasets from public, private or enterprise sources. Data 101 may also include data derived from other datasets.

Crawler 102 crawls the data 101 to identify datasets and to find and extract metadata about the data, such as table and column names, relationships among data sets and columns, data types, etc. Crawler 102 provides the datasets and metadata to catalog 103. The metadata may include, for example, column names, tags, ratings, etc.

Auto-enrichment component 104 may add additional metadata to catalog 103. Crawler 102 will identify some metadata, but only if the metadata was present in the original dataset in data 101. Auto-enrichment component 104 may pair columns from different spreadsheets and may identify one column as an index to the other. Auto-enrichment component 104 may add metadata associated with one column to the related columns. For example, one spreadsheet may have column headings and a column in a related dataset may not have heading data. Auto-enrichment component 104 may add the heading metadata to the related columns.

Metadata cleaning component 105 provides users with an interface to access catalog 103. The user may use metadata cleaning component 105 to fix dataset and columns names, such as misspellings, to delete bad datasets, and to identify specific data types within the datasets. The catalog 103 may be cleaned and improved during use, such as by making corrections while the user is searching. Alternatively, catalog 103 may be cleaned in a more intentional manner by having the user specifically review and modify the datasets and metadata in the catalog 103.

The user accesses data catalog 103 via search interface 106. Depending upon the application, search interface 106 may provide different search experiences for the user. In one embodiment, search interface 106 provides stand-alone access to the catalog 103, such as a search engine that allows the user to find specific data or answer specific questions. In another embodiment, search interface 106 provides a "data open" function that allows the user to find data or data files for use with an application. In a further embodiment, search interface 106 utilizes the user's current context to improve the experience. For example, the search interface may observe the data that the user is working with, such as a spreadsheet, and then tailor the search results to be relevant to that data (such as an updated version of the spreadsheet) and/or present the results in the context of what is already opened.

Once the user has selected data from catalog 103 using search interface 106, that data may be provided to business intelligence/analytics component 107 for further analysis and/or processing.

Figure 2:
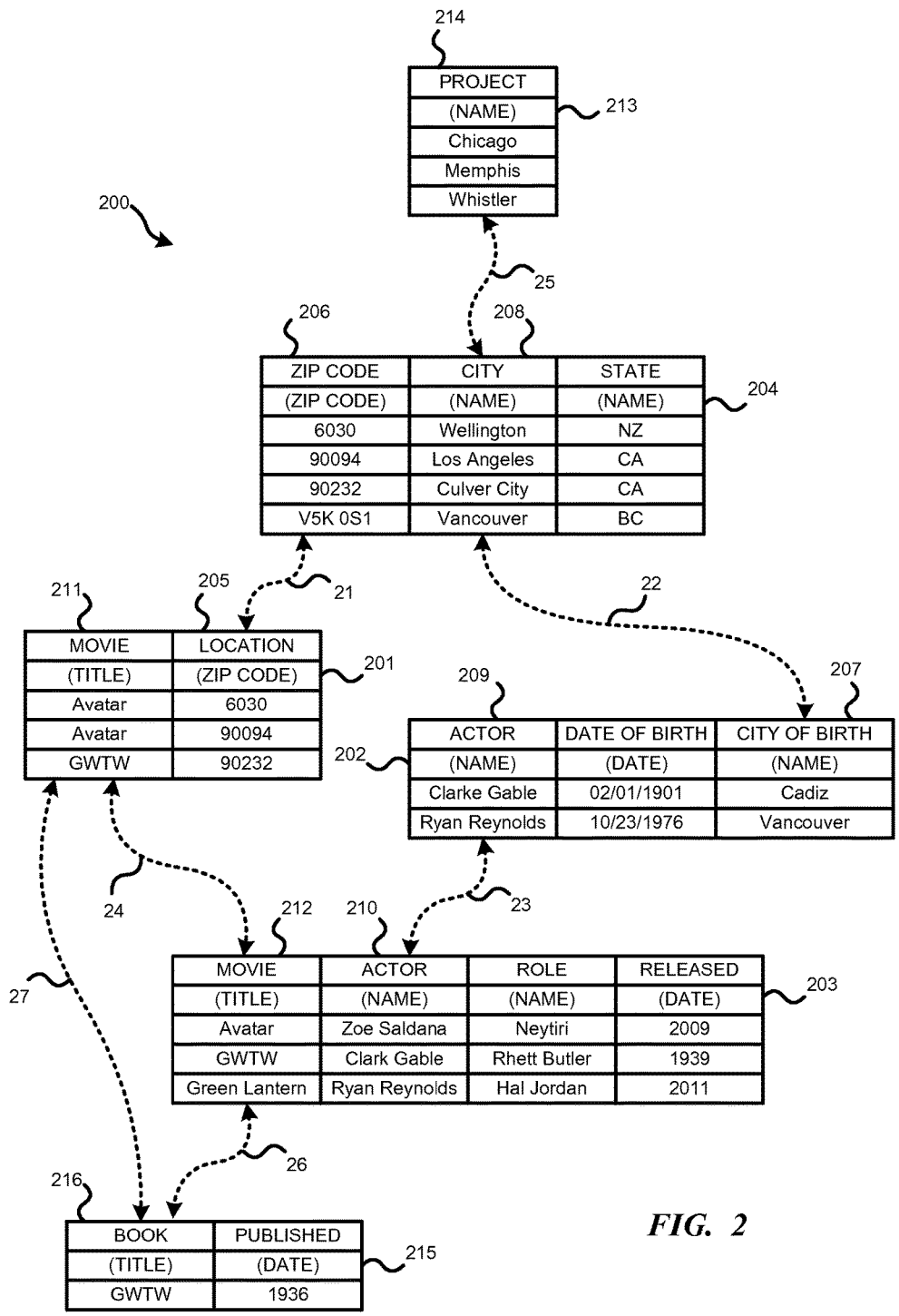
FIG. 2 illustrates relationships among a plurality of datasets in a data catalog.

FIG. 2 illustrates relationships among a plurality of datasets in a data catalog. The catalog 200 includes a movie location dataset 201 that includes a list of movie title names and a list of locations, identified by zip code, where the movie was filmed. The catalog also includes an actor dataset 202 that includes a list of actor names with each actor's date of birth and place of birth, identified by city name. Movie credits dataset 203 includes a list of movie title names along with the names of actors who starred in the movie, the corresponding role name for each actor, and the date each movie was released. The catalog also includes other datasets that are not related to the entertainment industry, such as a listing of postal codes, such as zip codes 204, that indicate the city and state for each postal code.

These datasets may be added to the catalog by a crawler or other means. Some of the datasets may have various levels of metadata, such as column names, table titles, or tags. Alternatively, other datasets may just include columns of data without any associated metadata. A user may access the catalog using a metadata cleaning component and provide metadata to some datasets and/or correct metadata on other datasets.

An auto-enrichment function may analyze the datasets and identify relationships among them. For example, the auto-enrichment function may recognize that a column 205 in movie location dataset 201 is a list of numbers that are similar to column 206 of zip code dataset 204. These columns may have no heading metadata, or they may have the same heading metadata (e.g. both labeled "zip code") or different heading metadata (e.g. one labeled "zip code" and other labeled "location"). The auto-enrichment function may recognize a relationship 21 between the columns using the metadata and/or using the content of the columns. In the example illustrated, for example, column 205 may be identified as a subset of column 206.

Additional relationships may be identified by the auto-enrichment function. For example the system may identify relationship 22 in which a list of cities in column 207 of actor dataset 202 identified as a subset of the list of cities in column 208 of zip code dataset 204. Also, the auto-enrichment function identifies relationship 23 in which overlapping actor names are observed in column 209 of the actor dataset 202 and column 210 of movie credits dataset 203. Additionally, the system identifies relationship 24 in which overlapping movie names are observed in column 211 of the move location dataset 201 and column 212 of movie credits dataset 203.

It will be understood that the enriched catalog 200 illustrated in FIG. 2 is a highly simplified example. Any number of datasets may exist in the catalog. Additionally, any number of relationships may be identified among the datasets. The relationships may have various degrees of strength based upon, for example, the number of overlapping values or the similarity of the metadata. Some columns in the datasets may have multiple relationships. Dataset 213 may be a list of project names for a company. The company may use the names of cities for the projects. The enrichment function will recognize the city/project names in column 214 of dataset 213 as a subset of the city names in column 208. Accordingly, it will identify a relationship 25 between these two columns.

Other databases may be interpreted as being related or potentially related to movie datasets 201 and 203. For example, a book-title dataset 215 may list book titles and the dates that each book was published. The enrichment function may identify an overlap in book names in column 216 of book-title dataset 215 and the movie titles in movie data sets 201 and 203 because some of the books may have been made into movies (or books were written about the movie). Accordingly, relationships 26 and 27 may also be identified among these datasets and columns.

The enriched data catalog may be searched using terms that identify values for entertainment related domains. For example, if the user wanted to identify movies featuring actors born in Vancouver, then the user can search the enriched catalog 200 without choosing the specific tables or datasets to search and without knowing the format of the datasets.

In this example, the names of the movies are unknown, so the user provides a list of known random movie titles to identify the "movie title" type as relevant. For example, the user may list Gone with the Wind ("GWTW" in FIG. 2) which may return datasets 201 and 203 that include movie titles. However, this name may result in the identification of additional databases that may be unwanted, such as a book-title database 215, if the book Gone with the Wind is listed. The user can eliminate these false-positive returns by adding additional movie titles that were not based on books, such as Avatar, for example. This revised movie-title list may eliminate the unwanted book-title database 215 from the suggested-dataset results or may cause the movie-title datasets 201 and 203 to be ranked higher than the book-title database 215 in the suggested results.

The user also adds the city names to the query. Specifically, the user would add "Vancouver" to the query terms. This may result in hits in the project name dataset 213, postal code dataset 204, and actor dataset 207. These datasets may be added to the suggested results list. Table 1 illustrates a suggested results list provided by a search interface according to one embodiment using the search terms "Gone with the Wind," "Avatar," and "Vancouver."

TABLE 1

| | APPEARANCE OF SEARCH TERMS | | | |
|---|---|---|---|---|
| SUGGESTED DATASET | GONE WITH THE WIND | AVATAR | VAN-COUVER | RANKING |
| 201 | X | X | | 1 |
| 203 | X | X | | 1 |
| 215 | X | | | 2 |
| 202 | | | X | 3 |
| 204 | | | X | 3 |
| 213 | | | | 4 |

Datasets 201 and 203, which each have two of the search terms, are ranked first. Datasets 215, 202, and 204 each have only one of the search terms and, therefore, are ranked below datasets 201 and 203. Dataset 215 may be ranked ahead of datasets 202, 204 and 213, for example, because it has a search term that appears earlier in the list (i.e. "Avatar" was listed before "Vancouver"). Dataset 213 may be ranked last because it does not include any of the specific example terms. It will be understood that the search terms and/or datasets may be weighted in other embodiments, which may change the ranking of the suggested datasets.

The suggested datasets in Table 1 provide the user with a group of datasets of potential interest. However, these results do not answer the user's query, which is "what movies feature actors born in Vancouver?" The search interface can further narrow the proposed datasets by showing the user how these datasets are related and what the resulting information will include if the datasets are combined.

In the example above, the search interface has identified the movie-title type (e.g. columns 211, 212) and the city-name type (e.g. columns 207, 208, 214) as being relevant. The search interface also provides examples of results that link these two types. For example, Table 2 shows the results when the movie-title type (column 211) is linked to the city-name type (column 208) through the location relationship 21 between location-postal-code columns 205 and 206. The system provides an example of entries linking these types to the user in a format such as Table 2 or in any other appropriate format. The search interface may also provide additional information about the example, such as the identities of the datasets, the columns used within the datasets, and any relationships among the datasets.

TABLE 2

| MOVIE | LOCATION | CITY |
|---|---|---|
| Avatar | 90094 | Los Angeles |

Table 3 is a second example illustrating results from linking these the movie-title and city-name types. Table 3 shows the results when the movie-title type (column 212) is linked to the city-name type (column 207) through the location relationship 23 between actor-name columns 209 and 210.

TABLE 3

| MOVIE | ACTOR | CITY |
|---|---|---|
| Gone with the Wind | Clark Gable | Cadiz |

The system may present the examples in a ranked list based upon the weight assigned to the search terms and/or datasets. There may be other example responses listed using alternative or longer relationship paths between the movie-title and city-name types that have been identified by the user.

The user would likely select the example illustrated in Table 3 because it includes actor names in the results, which is relevant to the user's search.

In another embodiment, the user may not like the examples suggested or may not be confident that any of the examples are appropriate. The user can further narrow down the suggestions by adding known pairs for the desired result set. For example, in addition to using the search terms "Gone with the Wind," "Avatar," and "Vancouver," the user could add known actor-name and birth-city examples to the search terms. By adding a known actor-name/birth-city example, the system would be likely to identify the results of Table 3 as more relevant than the results of Table 2, which has no actor information. Therefore, the system would determine that relationship 23 through the actor-name type is a desired path.

Once the user has selected the example results that match the query, then the datasets for the selected example may be provided to a business intelligence/analytics component for further processing. For example, if the user selected Table 3 above, then datasets 203 and 202 would be provided to the business intelligence/analytics component, which would combine the data and build a new combined dataset or pivot table based on the example. The new combined dataset or pivot table could then be summarized, organized, or otherwise processed or analyzed by the user.

The system allows the user to give examples using words that relate to the question. The enriched catalog identifies the domains associated with the example words and then identifies datasets having those domains. The system presents the user with example results that are created when those datasets are combined. The user may select one of the example result sets or may add more search terms to narrow the example results. As noted above, one way to narrow the results sets is to give examples of known pairs that are similar to the desired data.

Figure 3:
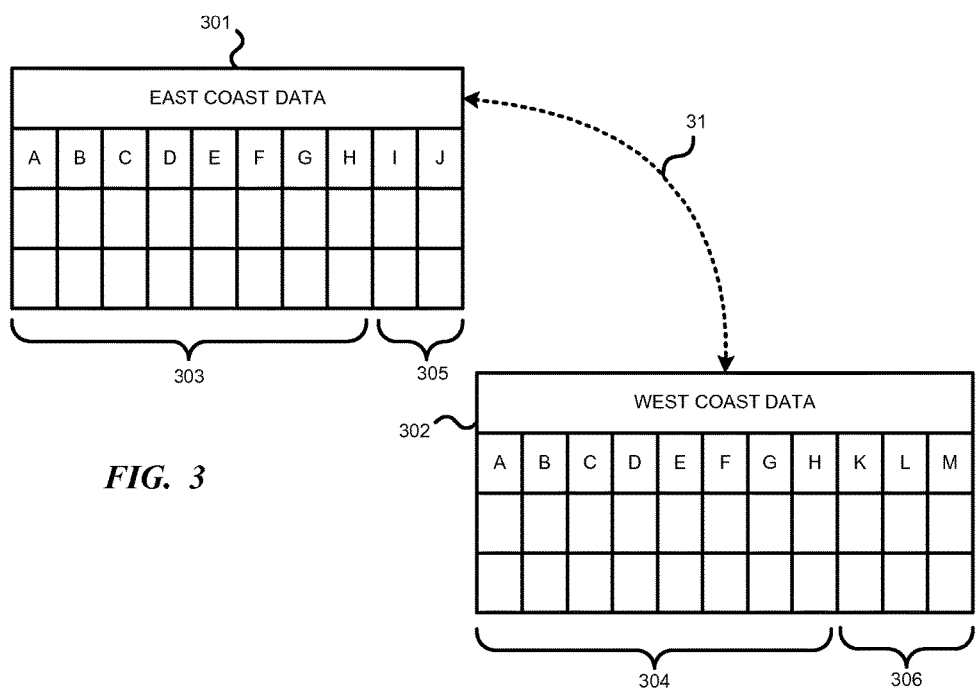
FIG. 3 is another example of linking datasets in a data catalog using an auto-enrichment function.

FIG. 3 is another example of linking datasets in a data catalog using an auto-enrichment function. Dataset 301 comprises ten columns A-J of data collected for an east coast facility. Dataset 302 comprises eleven columns A-H, K-M of data collected for a west coast facility. The datasets have similar, but not identical, sets of columns. Columns A-H 303, 304 appear in both datasets. Each dataset has additional unique columns 305, 306. The datasets have similar schema and the same key columns. The auto-enrichment function will observe the similar schema between data sets 301 and 302 and will conclude that they have the same types of values. A relationship path 31 will be established between the datasets 301 and 302.

The search interface will know that these tables have similar schema and overlapping domains. Therefore, when a user enters example terms that appear in one dataset, such as names of east coast cities in dataset 301, then the search interface will also look at dataset 302, which it knows has related values.

The datasets 301 and 302 may be related, for example, as different versions of the same table or one dataset may be a pseudo foreign key to the other dataset or a pseudo schema of the other dataset. The relationship graph built in the enriched catalog will allow the search interface to find these related datasets.

Figure 4:
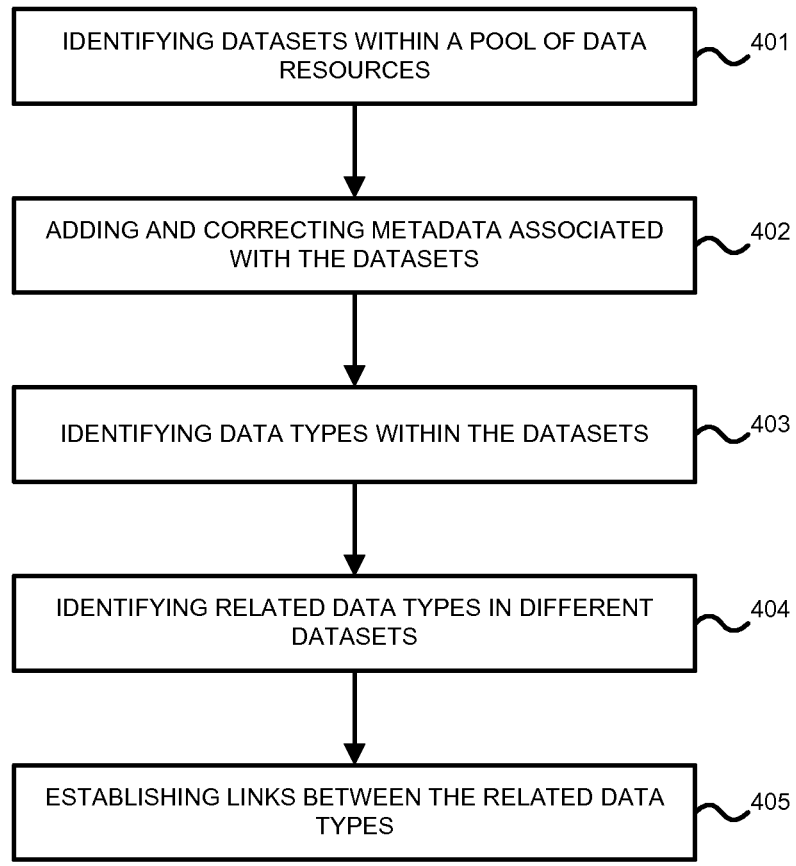
FIG. 4 is a flowchart illustrating a method for creating an enriched data catalog according to one embodiment.

FIG. 4 is a flowchart illustrating a method for creating an enriched data catalog according to one embodiment. In step 401, a pool of data resources are crawled and datasets are identified. The pool of data resources may include, for example, public, private or enterprise sources. The datasets may include, for example, databases, spreadsheets, lists or subsets of other datasets. In step 402, metadata is added to the datasets and existing metadata is corrected, if necessary. The metadata may include, for example, table and column names, relationships among datasets, data types, tags, etc.

In step 403, data types are identified within the datasets. The data types may identify, for example, the type of values that are stored in a column. The data types may be general, such as identifying the values as text, dates, numbers, or other values, or they may be more specific, such as identifying the values as names, birth dates, titles, zip codes, addresses, etc. In step 404, relationships are identified among the data types in different dataset. In step 405, links are established between the related data types. For example, if columns in two different datasets are both identified as having a date data type, then those columns may be identified as related and linked. The relationships may be weighted or ranked based upon, for example, the similarity of the values in the different columns or a user-assigned weight.

An auto-enrichment process may be used to analyze the datasets and to identify the data types, identify related data types and establish links among the data types. In one embodiment, an auto-enrichment process analyzes all datasets in a catalog and generates relationships among any similar data types within different datasets to create an enriched data catalog.

Figure 5:
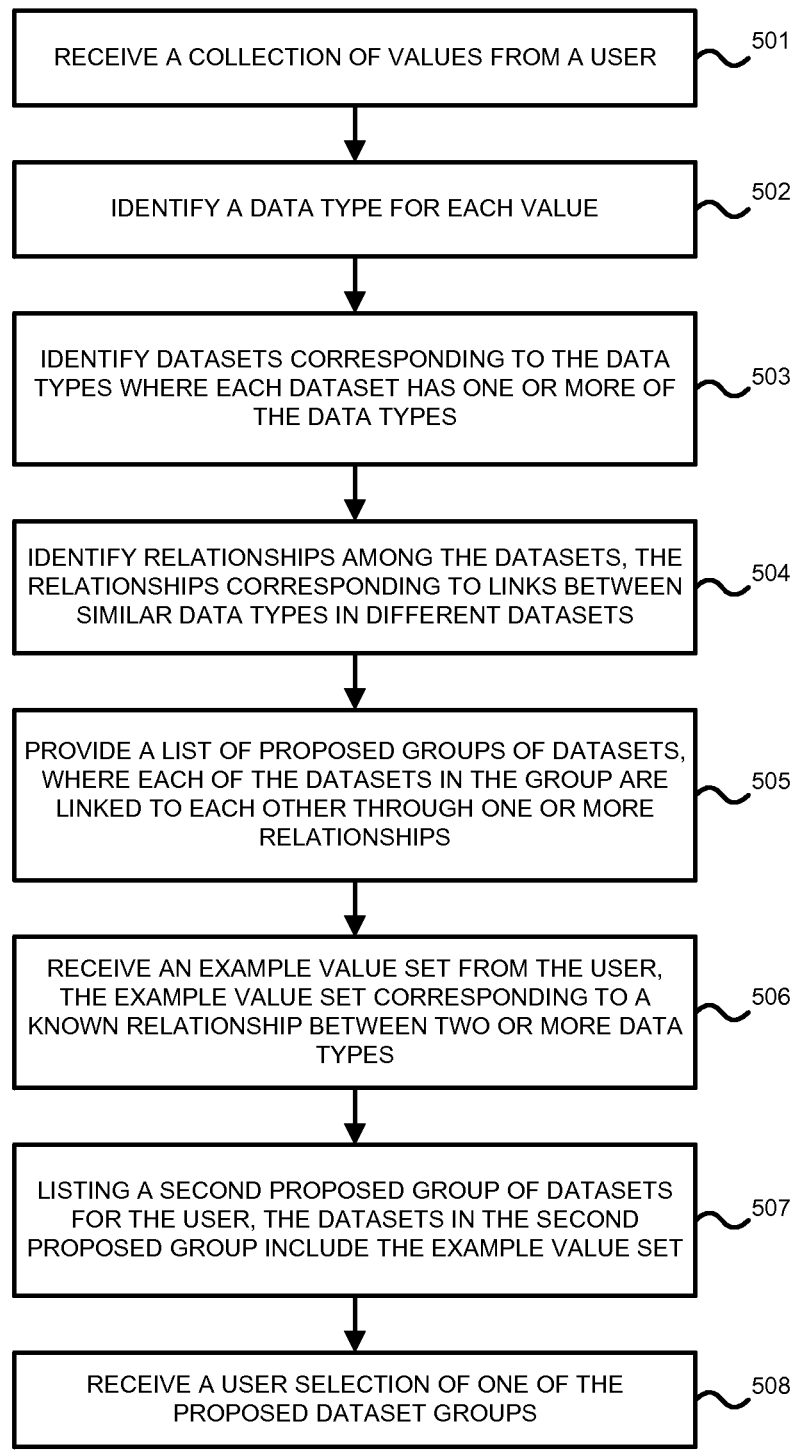
FIG. 5 is a flowchart of a method for identifying relevant datasets to a user according to one embodiment.

FIG. 5 is a flowchart of a method for identifying relevant datasets to a user according to one embodiment. In step 501, a collection of values are received from a user. The data type for each of the values is identified in step 502. In step 503, datasets that correspond to the data types are identified. Each data set identified in step 503 has one or more of the data types that correspond to the values received from the user.

In step 504, relationships are identified among the datasets. The relationships correspond to links between similar data types in different datasets. A list of proposed groups of datasets is provided in step 505. The datasets within each proposed group are linked to each other through one or more relationships.

In step 506, an example value set is received from the user. The example value set corresponds to a known relationship between two or more data types. In step 507, a second proposed group of datasets are listed for the user. The datasets within the second proposed group include the example value set that the user has provided. In step 508, a user selection of one of the proposed dataset groups is received.

In other embodiments, the datasets within the selected proposed dataset group may be combined into a new dataset. For example, the subsets of the datasets within the selected proposed dataset group may be combined into a new dataset.

The proposed groups of datasets do not have to be similar or directly linked. The datasets in the proposed groups may be linked to each other through the relationships to intermediate datasets that do not have data types corresponding to the values received from the user. For example, if the user-provided values are matched to data types A and B, then a dataset having data types A and C may be grouped with a dataset having data types B and C. The common data type C may be used to relate one data to another even though it is not associated with the user-provided values.

The proposed groups of datasets may also comprise datasets with overlapping data types. The overlapping data types may or may not correspond to the values received from the user, but the datasets would include at least one of the data types corresponding to the user-provided values.

The list of proposed groups of dataset may be ranked or weighted. For example, the dataset groups may be ranked based upon weights assigned to one or more of the data types, datasets, and values received from the user.

Figure 6:
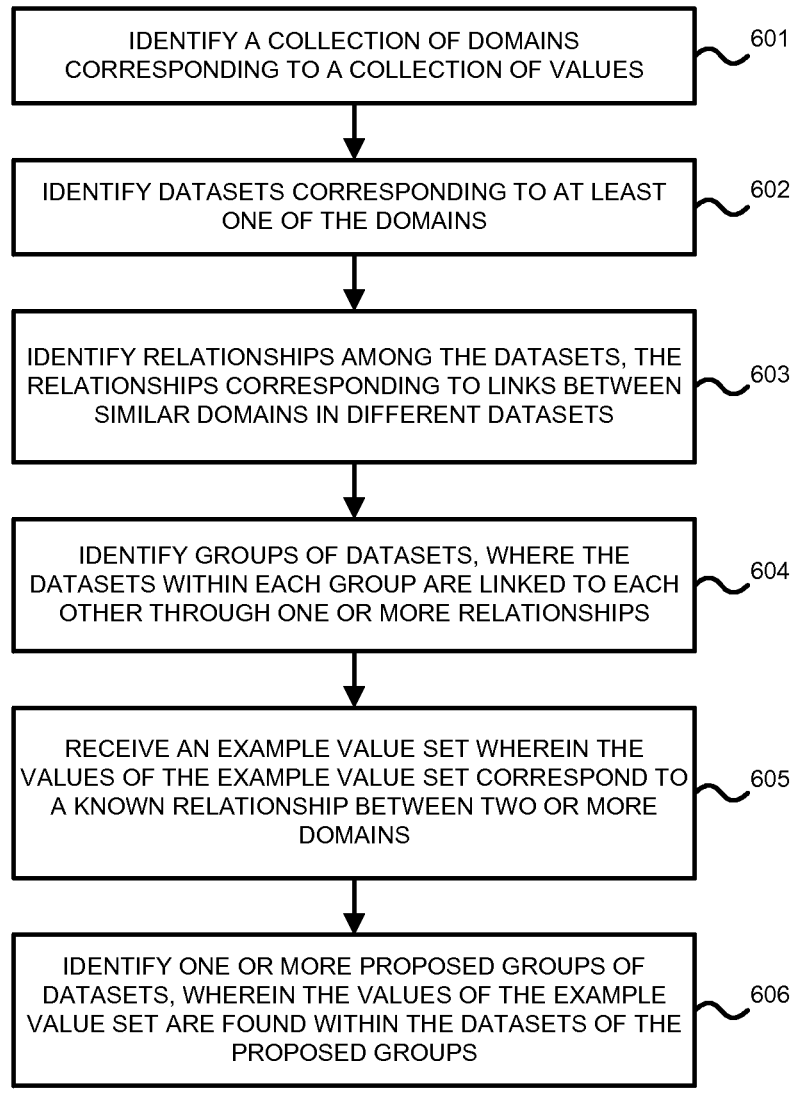
FIG. 6 is a flowchart of a method for identifying relevant datasets according to an alternative embodiment.

FIG. 6 is a flowchart of a method for identifying relevant datasets according to an alternative embodiment. In step 601, a collection of domains are identified as corresponding to a collection of values. In step 602, datasets are identified as corresponding to at least one of the domains. Relationships among the datasets are identified in step 603. The relationships correspond to links between similar domains in different datasets.

In step 604, groups of datasets are identified. The datasets within each proposed group are linked to each other through one or more relationships. An example value set is received in step 605. The example value set corresponds to a known relationship between two or more domains. In step 606, one or more proposed groups of datasets are identified. The values of the example value set are found within the datasets of the proposed groups.

In one embodiment, all of the values of the example value set are found within the datasets of the proposed groups. In other embodiments, at least one of the values of the example value set is found within the datasets of the proposed groups.

It will be understood that steps 501-508 of the process illustrated in FIG. 5 and steps 601-606 of the process illustrated in FIG. 6 may be executed simultaneously and/or sequentially. It will be further understood that each step may be performed in any order and may be performed once or repetitiously.

In other embodiments, the datasets may be processed in a distributed computing network or cloud computing environment, such as a set of pooled computing resources delivered over the Internet. The cloud may provide a hosting environment that does not limit an application, such as a data crawler, search interface, metadata cleaning operation, auto-enrichment function, or business intelligence/analytics, to a specific set of resources. Depending on the platform, applications may scale dynamically and increase their share of resources on-the-fly. For example, in FIG. 1, data 101 and catalog 103 may be components of a distributed storage devices in a cloud computing environment. Additionally, crawler 102, auto-enrichment 104, metadata cleaning 105, search interface 106, and business intelligence/analytics 107 may run on one or more virtual machines in the cloud computing environment. These components may also be embodied in a distributed or centralized data center.

Figure 7:
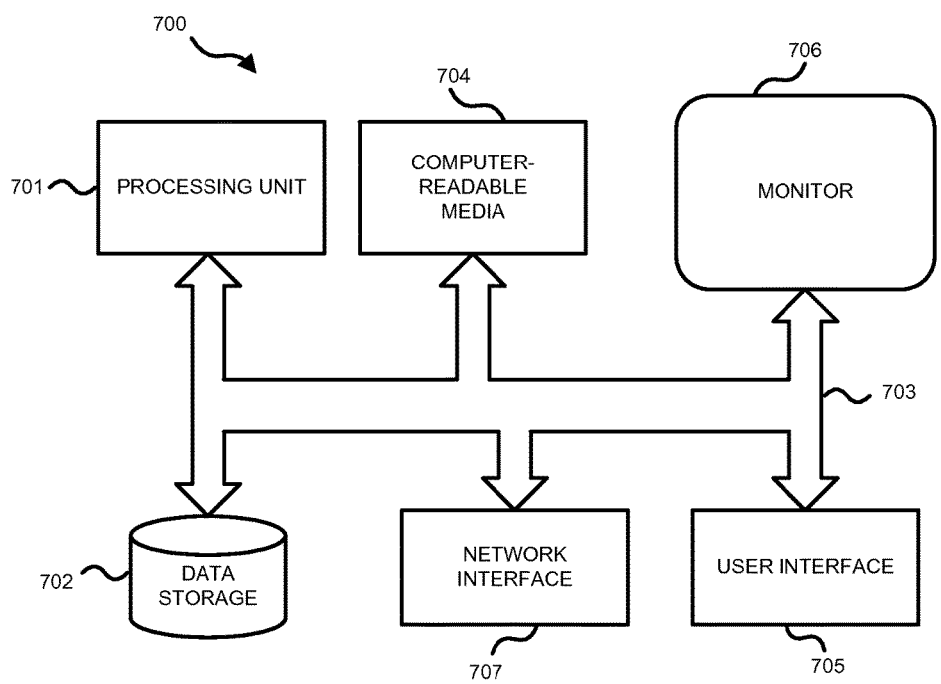
FIG. 7 illustrates a suitable computing and networking environment to identify datasets to a user using a collection of values and an example relationship.

FIG. 7 illustrates a suitable computing and networking environment 700 on which the examples of FIGS. 1-6 may be implemented to identify datasets to a user using a collection of values and an example relationship. The computing system environment 700 is intended as an example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data processing system for searching datasets by examples, the system comprising:
a processor; and
a memory coupled to the processor, the memory configured to store program instructions executable by the processor to cause the data processing system to:
receive a collection of values from a user, each value in the collection of values having a data type which is to serve as a basis for searching a pool of data resources for corresponding groups of datasets, the pool of data resources being distinct from the received collection of values;
identify a data type for each of the values;
identify datasets that correspond to the data types, each identified dataset comprising one or more of the data types identified in the collection of values;
identify relationships among the datasets, the relationships corresponding to links between similar data types in different datasets; and
provide a list of proposed groups of datasets, wherein the datasets within each proposed group are linked to each other through one or more relationships.

2. The data processing system of claim 1, further comprising: receive an example value set from the user, the example value set corresponding to a known relationship between two or more data types.

3. The data processing system of claim 2, further comprising: list a second proposed group of datasets for the user, wherein the datasets within the second proposed group include the example value set.

4. The data processing system of claim 1, further comprising: receive a user selection of one of the proposed dataset groups.

5. The data processing system of claim 4, further comprising: combine the datasets within the selected proposed dataset group into a new dataset.

6. The data processing system of claim 4, further comprising: combine subsets of the datasets within the selected proposed dataset group into a new dataset.

7. The data processing system of claim 1, wherein the list of proposed groups of datasets are linked to each other through the relationships to intermediate datasets that do not have data types corresponding to the values received from the user.

8. The data processing system of claim 1, wherein the list of proposed groups of datasets comprises datasets that have overlapping data types corresponding to the values received from the user.

9. The data processing system of claim 1, further comprising: rank the list of proposed groups of datasets, the ranking based upon weights assigned to one or more of the data types, datasets, and values received from the user.

10. A method for facilitating searching datasets by examples, the method comprising: performing, by one or more processors in a computer system:
identifying a collection of domains corresponding to a collection of values; identifying datasets corresponding to at least one of the domains;
identifying relationships among the datasets, the relationships corresponding to links between similar domains in different datasets;
identifying groups of datasets, wherein the datasets within each proposed group are linked to each other through one or more relationships;
receiving an example value set, each value in the example value set having a data type which is to serve as a basis for searching the groups of datasets and the example value set corresponding to a known relationship between two or more domains; and
identifying one or more proposed groups of datasets, wherein each identified proposed group of datasets comprises at least one data type corresponding to a value in the example value set, and wherein values of the example value set are found within the datasets of the proposed groups.

11. The method of claim 10, wherein all of the values of the example value set are found within the datasets of the proposed groups.

12. The method of claim 10, wherein at least one of the values of the example value set is found within the datasets of the proposed groups.

13. The method of claim 10, further comprising: receiving a user selection of one of the proposed dataset groups.

14. The method of claim 13, further comprising: combining the datasets within the selected dataset group into a new dataset.

15. The method of claim 13, further comprising: combining subsets of the datasets within the selected dataset group into a new dataset.

16. The method of claim 10, wherein the datasets in the proposed groups are linked to each other through the relationships to intermediate datasets that do not include the domains in the collection of domains.

17. The method of claim 10, wherein the datasets in the proposed groups comprise datasets that have overlapping domains corresponding to the collection of values.

18. The method of claim 10, further comprising: ranking the proposed groups of datasets.

19. A computer-readable storage medium storing computer-executable instructions that when executed by at least one processor cause the at least one processor to perform a method for identifying groups of datasets, the method comprising:
identify a collection of data types corresponding to a collection of values; identify datasets corresponding to at least one of the data types identified in the collection of values;
identify relationships among the datasets, the relationships corresponding to links between similar data types in different datasets;
identify groups of datasets, wherein the datasets within each proposed group are linked to each other through one or more relationships; receive an example value set from the user, each value in the example value set having a data type which is to serve as a basis for searching the groups of datasets and the example value set corresponding to a known relationship between two or more data types; and
identify one or more proposed groups of datasets, wherein each identified proposed group of datasets comprises at least one data type corresponding to a value in the example value set, and wherein values of the example value set are found within the datasets of the proposed groups.

20. The computer-readable storage medium of claim 19, wherein the method further comprises: receive a user selection of one of the proposed dataset groups; and combining subsets of the datasets within the selected dataset group into a new dataset.

* * * * *